3,642,858
CARBONATE SYNTHESIS FROM ALKYLENE CARBONATES

Ludo K. Frevel and Jo Ann Gilpin, Midland, Mich., assignors to The Dow Chemical Company, Midland, Mich.
No Drawing. Filed Feb. 12, 1969, Ser. No. 798,765
Int. Cl. C07c 69/00; C10m 3/20
U.S. Cl. 260—463        9 Claims

ABSTRACT OF THE DISCLOSURE

Carbonates having the formula

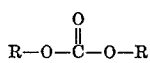

are made by reacting an alkylene carbonate having the formula

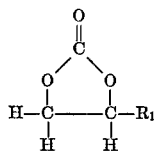

with a non-tertiary hydroxy-containing compound having the formula

while in the presence of a catalytic amount of an alkali metal or a derivative thereof wherein R is an alkyl or alkoxyalkyl and $R_1$ is H, alkyl or alkoxyalkyl. These carbonates are useful as synthetic lubricants, solvents for cellulosic compounds, e.g. cellulosic ethers, and in lacquer fixation.

BACKGROUND OF THE INVENTION

Alkyl carbonates are typically produced by contacting phosgene with the appropriate alcohol. See Drake et al., J. Am. Chem. Soc., 52, 3720 (1960) and U.S. Pat. No. 2,379,250 for typical examples.

The hydrogen chloride that is produced by this process is not easily eliminated and leads to the production of chlorine-containing products. Attempts to neutralize the hydrogen chloride, e.g. with an acid acceptor, have lead to processing difficulties. Moreover, when secondary alcohols are employed, the competing reaction involving alkyl chloride formation is serious and necessitates the use of an acid acceptor.

SUMMARY OF THE INVENTION

A process for producing carbonates having the formula

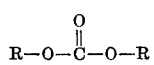

has now been discovered. The use of this process avoids phosgene as a starting material and, in general, results in a clean reaction product involving little processing difficulties.

This new process comprises contacting an alkylene carbonate having the formula

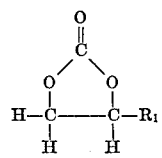

with a non-tertiary hydroxy-containing compound having the formula

while in the presence of a catalytic amount of an alkali metal or a derivative thereof. In each of the formulas herein, each R independently is alkyl or alkoxyalkyl and $R_1$ is H, alkyl or alkoxyalkyl.

In order to practice the invention, a hydroxy-containing compound having the formula

is contacted, in any convenient manner, with an alkylene carbonate having the formula

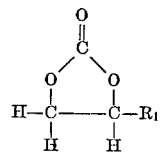

while in the presence of a catalytic amount of an alkali metal or a basic derivative thereof. Typically, the reaction is conducted in a sealed or coil reactor. After reaction, usually in 0.2–24 hours, the catalyst is preferably neutralized with a strong acid, e.g. hydrogen chloride and the desired carbonate is separated from the reaction mixture by conventional techniques, e.g. fractional distillation. The major by-product of this reaction is a glycol having the formula

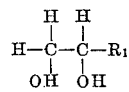

Thus, typical alkylene carbonates useful as starting materials include ethylene carbonate, the 1,2-alkylene carbonates and the alkoxyalkyl-substituted ethylene carbonates. Preferred carbonates are those having an $R_1$ group containing up to about ten carbon atoms; most preferred are those containing up to about six carbon atoms. Included within the preferred 1,2-alkylene carbonates, are 1,2-propylene carbonate, 1,2-butylene carbonate, 1,2-pentylenecarbonate, 1,2-hexylene carbonate, 1,2-octylene cabonate, 1,2-dodecylene carbonate, 3-methyl-1,2-butylene carbonate, 3-methyl-1,2-pentylene carbonate, 3-ethyl-1,2-pentylene carbonate, 4-methyl-1,2-pentylene carbonate, 5-methyl-1,2-hexylene carbonate and the like. Included within the preferred alkoxyalkyl-substituted ethylene carbonates are 3-methoxy-1,2-propylene carbonate, 3-ethoxy-1,2-propylene carbonate, 3-n-propoxy-1,2-propylene carbonate, 4-methoxy-1,2-butylene carbonate, 4-ethoxy-1,2-butylene carbonate, 3-methoxy-1,2-butylene carbonate, 5-methoxy-1,2-heptylene carbonate and the like.

Typical non-tertiary hydroxy-containing compounds useful as starting materials include the non-tertiary alkanols, e.g. those having up to about twelve carbon atoms and preferably up to about six carbon atoms, and the non-tertiary alkoxyalkanols, e.g. those having up to about ten carbon atoms and preferably up to about six carbon atoms. Thus, the preferred R groups are those having up to about twelve carbon atoms and most preferred are those having up to about six carbon atoms. Typical alkanol starting materials are methanol, ethanol, propanol, isopropanol, n-butanol, isobutanol, n-pentanol, isopentanol, n-dodecanol, n-octanol and the like. Typical alkoxyalkanol starting materials include 2-methoxyethanol, 2-ethoxyethanol, 3-methoxy-n-propanol, 3-ethoxy-n-propanol, 4-methoxy-n-butanol, 2-ethoxy-n-butanol, 3-methoxy-n-butanol, n-propoxyethanol and the like.

Included within the carbonates produced by this process are the alkyl carbonates, e.g. dimethyl carbonate, diethyl carbonate, di-n-propyl carbonate, di-n-butyl carbonate, di-n-octyl carbonate, di-isopentyl carbonate and the like and the alkoxyalkyl carbonates, e.g. bis(methoxyethyl) carbonate, bis(2-methoxypropyl) carbonate, bis(2-ethoxyethyl) carbonate, bis(2-n-propoxyethyl) carbonate, bis(3-methoxypropyl) carbonate and the like.

Of course, when two different types of hydroxy-containing compounds are used in the process of the invention, the carbonate products will not only include the symmetrical carbonates corresponding to the two types of hydroxy-containing compounds employed, but will, in addition contain the unsymmetrical carbonate. For example, a mixture of methanol and ethanol will produce some dimethyl carbonate, some diethyl carbonate and some methyl ethyl carbonate.

The catalysts used in this invention are the alkali metals and their basic derivatives. Thus, typical catalysts include lithium, sodium, potassium, rubidium, cesium and their hydrides, hydroxides, alcoholates, amides and the like; and the alkali metal salts formed from weak acids, e.g. acetates, carbonates, bicarbonates and the like.

The molar ratio of reactants can vary, but in general, it is preferred to use a molar excess of hydroxy-containing compound. For example, a molar ratio of hydroxy-containing compound to alkylene carbonate of at least 2/1 is preferred. Typically a catalytic amount of the alkali metals or their derivatives is used to catalyze the reaction; e.g. about 0.01–0.3 percent by weight of the reaction solution is suitable.

The temperature of the reaction can vary but it is generally preferred to conduct the reaction at a temperature between about 100 and 250° C. and typically between 175 and 225° C. The pressure can also vary but preferred pressures are autogenous pressures of at least one atmosphere.

Many of the carbonates produced by this reaction are well-known and are useful as synthetic lubricants, solvents and chemical intermediates. For example, diethyl carbonate is an intermediate in the production of phenobarbital. Many carbonates produced by this process are solvents for cellulosic compounds, e.g. cellulose nitrate.

DESCRIPTION OF SPECIFIC EMBODIMENT

Several reactions were conducted in heavy-walled glass ampoules. The ampoules were purged with argon and charged with catalyst, hydroxy-containing compound and alkylene carbonate. The ampoules were then cooled and sealed in an argon atmosphere. After sealing, they were placed into a metal rocker bomb which was then pressurized to 1500 p.s.i. with nitrogen. The bomb was then rocked and kept at reaction temperature for a specified time.

After this time, the bomb was cooled and vented and the glass ampoule was opened and allowed to warm to room temperature. The reaction products were then analyzed by gas chromatography and nuclear magnetic resonance.

Special reactions and their conditions are reported in the table below. The reaction temperature, except where otherwise indicated, was 200° C.

TABLE

| Run No. | Reaction time, hrs. | Catalyst Type | Catalyst Amt., mg. | Reactants, millimoles Hydroxy-compound | Reactants, millimoles Carbonate | Product, weight percent of total mixture | |
|---|---|---|---|---|---|---|---|
| 1 | 1.75 | NaOCH$_3$ | 26 | Methanol 82.6 | 1,2-propylene carbonate 17.9 | Dimethyl carbonate | 13 |
| 2 | 3.0 | NaOCH$_2$CH$_3$ | 10 | Ethanol 51.1 | Ethylene carbonate 11.2 | Diethyl carbonate | 18 |
| 3[1] | 16.0 | NaOCH$_2$CH$_3$ | 14 | ...do... 224 | 1,2-propylene carbonate 52.2 | ...do... | 3 |
| 4 | 6.0 | NaOCH$_2$CH$_3$ | 31 | ...do... 171 | ...do... 39 | ...do... | 13 |
| 5 | 3.0 | NaOCH$_2$CH$_3$ | 7 | ...do... 51 | ...do... 12 | ...do... | 13 |
| 6 | 1.5 | NaOCH$_2$CH$_3$ | 14 | ...do... 49.1 | ...do... 13.4 | ...do... | 13 |
| 7 | 1.5 | NaOCH$_2$CH$_3$ | 47 | ...do... 38.5 | ...do... 18.0 | ...do... | 12 |
| 8 | 1.5 | NaOCH$_2$CH$_3$ | 19 | ...do... 57.1 | ...do... 12.0 | ...do... | 12 |
| 9 | 2 | NaOH | 25 | ...do... 144 | ...do... 38.5 | ...do... | 13 |
| 10 | 2 | Na$_2$CO$_3$ | 50 | ...do... 140 | ...do... 38.7 | ...do... | 13 |
| 11 | 2 | NaOAc | 76 | ...do... 116 | ...do... 26.4 | ...do... | 13 |
| 12 | 2 | NaOCH$_2$CH$_3$ | 29 | n-Propanol 103 | ...do... 22.0 | Di-n-propyl carbonate | 9 |
| 13 | 2 | NaOCH$_2$CH$_3$ | 49 | Isopropanol 171 | ...do... 50.7 | Di-isopropyl carbonate | 5 |
| 14 | 2 | NaOCH$_2$CH$_3$ | 63 | n-Butanol 77.8 | ...do... 27.0 | Di-n-butyl carbonate | 15 |
| 15 | 2 | NaOCH$_2$CH$_3$ | 24 | 2-methoxyethanol 137 | ...do... 33.0 | Bis(2-methoxyethyl) carbonate | 10 |
| 16[2] | 6 | NaOCH$_2$CH$_3$ | 21 | Ethanol 125 | ...do... 23.4 | Diethyl carbonate | 13 |

[1] Reaction Temperature was 105° C.  [2] Reaction Temperature was 175° C.

We claim:

1. A process for making a carbonate having the formula

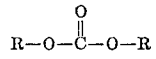

which comprises contacting an alkylene carbonate having the formula

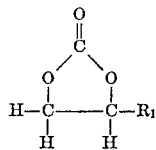

with a non-tertiary hydroxy-containing compound having the formula

while in the presence of a catalytic amount of an alkali metal or a basic derivative thereof wherein each R independently is alkyl or alkoxyalkyl and R$_1$ is H, alkyl, alkoxy or alkoxyalkyl.

2. A process as described in claim 1 wherein the temperature is between about 100 and 250° C.

3. A process as defined in claim 2 wherein a molar excess of hydroxy-containing compound is used.

4. A process as defined in claim 3 wherein each R has up to twelve carbon atoms and R$_1$ has up to ten carbon atoms.

5. A process as defined in claim 1 wherein the temperature is between 175 and 225° C.

6. A process as defined in claim 5 wherein the molar ratio of hydroxy-containing compound to alkylene carbonate is at least 2/1.

7. A process as defined in claim 6 wherein each R is alkyl having up to six carbon atoms and $R_1$ is H or alkyl having up to six carbon atoms.

8. A process as defined in claim 7 wherein the catalyst is an alkali metal, or a hydride, hydroxide, alcoholate, amide or basic salt thereof.

9. A process as defined in claim 8 wherein the hydroxy-containing compound is methanol or ethanol, the alkylene carbonate is ethylene carbonate or 1,2-propylene carbonate, the catalyst is sodium hydroxide or sodium carbonate and the pressure is autogenous.

References Cited
UNITED STATES PATENTS 2,915,529  12/1959  Bell et al. _____ 260—340.2
3,133,113  5/1964  Malkemus _____ 260—463

LEWIS GOTTS, Primary Examiner

D. G. RIVERS, Assistant Examiner

U.S. Cl. X.R.

252—52 R